US009593793B2

(12) United States Patent
Benson et al.

(10) Patent No.: US 9,593,793 B2
(45) Date of Patent: Mar. 14, 2017

(54) CHAINED CLAMP PIPELINE REPAIR STRUCTURE AND METHOD OF USE

(71) Applicant: Oceaneering International, Inc., Houston, TX (US)

(72) Inventors: Dan Thomas Benson, Tomball, TX (US); Dan Krohn, Houston, TX (US); Nghia K. Vuong, Katy, TX (US)

(73) Assignee: Oceaneering International, Inc., Houston, TX (US)

( * ) Notice: Subject to any disclaimer, the term of this patent is extended or adjusted under 35 U.S.C. 154(b) by 538 days.

(21) Appl. No.: 13/903,753

(22) Filed: May 28, 2013

(65) Prior Publication Data

US 2013/0255816 A1 Oct. 3, 2013

Related U.S. Application Data

(63) Continuation-in-part of application No. 13/436,377, filed on Mar. 30, 2012, now Pat. No. 8,607,826.

(60) Provisional application No. 61/756,982, filed on Jan. 25, 2013.

(51) Int. Cl.
| F16L 11/00 | (2006.01) |
| F16L 55/17 | (2006.01) |
| B23P 6/00 | (2006.01) |
| F16L 57/02 | (2006.01) |
| F16L 55/172 | (2006.01) |

(52) U.S. Cl.
CPC .............. *F16L 55/17* (2013.01); *B23P 6/00* (2013.01); *F16L 55/172* (2013.01); *F16L 57/02* (2013.01); *Y10T 29/49719* (2015.01)

(58) Field of Classification Search
CPC .................................................. F16L 55/168
USPC ................ 138/99, 157, 158, 109, 155, 161; 277/625; 285/910, 419, 146.1, 261
See application file for complete search history.

(56) References Cited

U.S. PATENT DOCUMENTS

| 4,565,381 A * | 1/1986 | Joelson | F16L 17/025 277/615 |
| 4,840,194 A * | 6/1989 | Berry | H02G 3/06 138/109 |
| 5,169,161 A * | 12/1992 | Jones | F16J 15/025 277/615 |
| 6,220,302 B1* | 4/2001 | Nolley | F16L 55/103 138/99 |
| 8,210,210 B2* | 7/2012 | Clark | F16L 55/168 138/97 |
| 8,789,852 B2* | 7/2014 | Wilkinson | F16L 55/172 138/97 |

(Continued)

Primary Examiner — Patrick F Brinson
(74) Attorney, Agent, or Firm — Maze IP Law PC

(57) ABSTRACT

Interlocking bend limiter sections are substantially mirror images of each other and are joined to form an interlocking bend limiter segment without use of fasteners by engaging each other's interlocking ends. An interlocking bend limiter comprises a plurality of interlocking bend limiter segment secured at an end by an end piece. In alternative, related embodiments a repair system comprises one or more machinable length sections which function as chain clamps to repair a subsea pipeline while the subsea pipeline is still in service and which can comprise interlocking sections similar to bend limiter sections or which are locked in more traditional manners such as by using bolts or other fasteners.

17 Claims, 3 Drawing Sheets

(56) References Cited

U.S. PATENT DOCUMENTS

| | | | |
|---|---|---|---|
| 8,961,017 B2* | 2/2015 | Muilenburg | B23P 6/00 138/167 |
| 2009/0133772 A1* | 5/2009 | Cachon | F16L 59/147 138/149 |
| 2011/0023975 A1* | 2/2011 | Clark | F16L 55/168 137/15.08 |

* cited by examiner

CHAINED CLAMP PIPELINE REPAIR STRUCTURE AND METHOD OF USE

This application claims the benefit of and is a continuation-in-part of pending U.S. patent application Ser. No. 13/436,377 titled 'Interlocking Bend Limited and Method of Use" filed Mar. 30, 2012 and claims the further benefit of U.S. Provisional Patent Application No. 61/756,982 entitled "Chained Clamp Pipeline Repair", filed Jan. 25, 2013, which is incorporated herein in its entirety by this reference.

FIELD OF THE INVENTION

The invention relates to a segmented bend limiter as well as to a segmentable subsea pipeline repair system and their respective methods of use. More specifically, the invention relates to either a segmented bend limiter that comprises a plurality of segments, each comprising cooperatively joinable halves, where the segment halves are dimensioned and configured to be joined without using additional fasteners, the terminal segment in a chain of segments being secured and fastened by an end fastener, or, in a different embodiment, to a subsea pipeline repair chain clamp comprising machinable length elements, or links, that may comprise two or more segment halves which may be dimensioned and configured to be joined without or without using additional fasteners assembled subsea in series on the subsea pipeline to whatever length is required to effect the repair.

BACKGROUND

A bend limiter is a device used to restrict bending of the flexible pipe. As the term is used in the art, a bend limiter includes a bend restrictor, bend stiffener, and/or bellmouth. Bend limiters are used to prevent possible the overbending of flexible flowlines, umbilicals and cables during installation and service. Typically, a bend limiter will lock or otherwise impede movement about two or more axes when a minimum bend radius is reached.

Bend limiters may be used onshore, offshore, and/or subsea and typically comprise a series of interlocking vertebrae joined to form a bend limiter having a desired length.

In addition to bend limiters, current subsea pipeline repair systems and methods require the pipe be shut down, oil or gas removed, repairs, and water pumped out, resulting in considerable lost production.

FIGURES

The figures supplied herein disclose various embodiments of the claimed invention.

DESCRIPTION OF EMBODIMENTS

Figure 1:
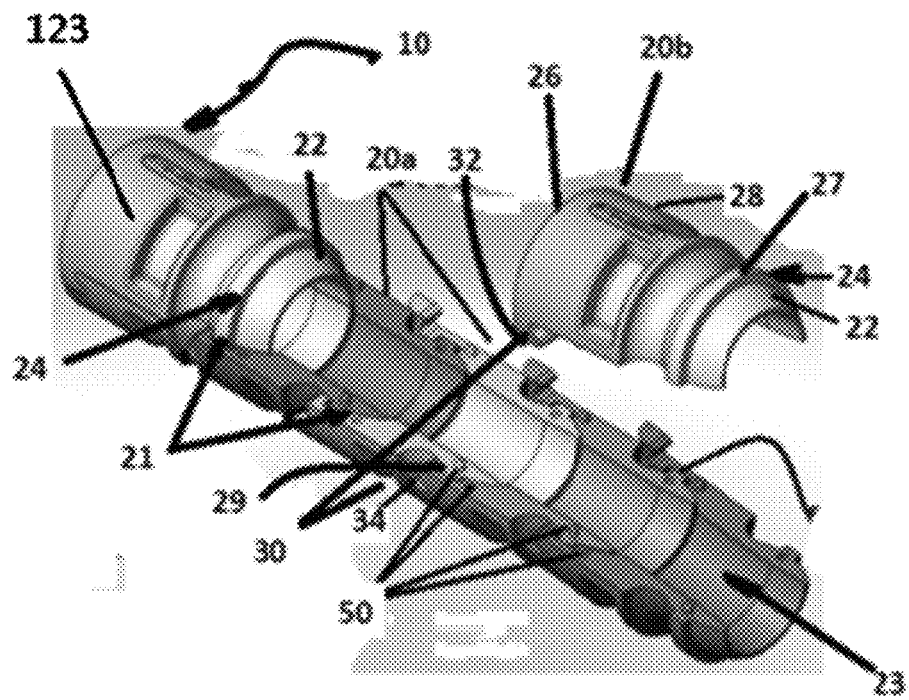
FIG. 1 is a cutaway planar view in partial perspective of an exemplary semi-tubular sections of an interlocking bend limiter.
Figure 2:
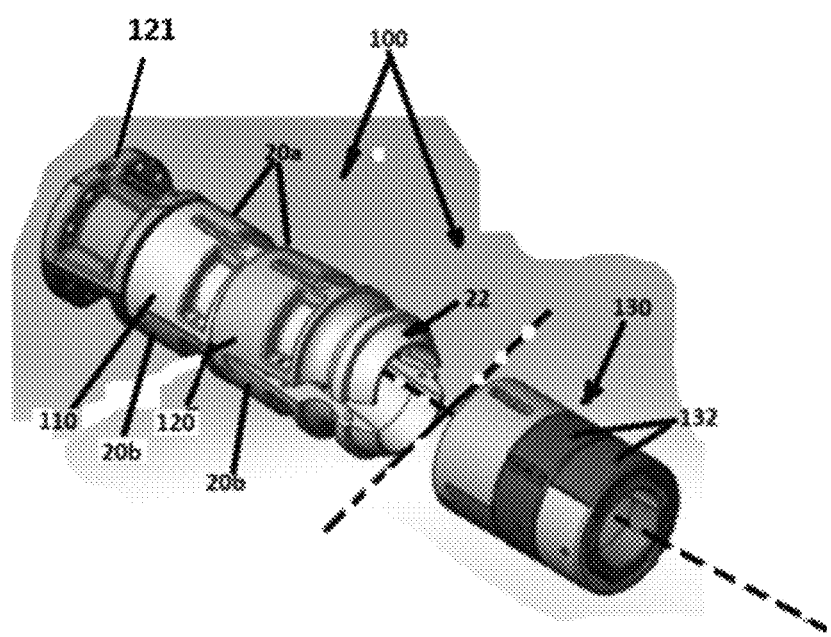
FIG. 2 is a further cutaway planar view in partial perspective of an exemplary semi-tubular section of an interlocking bend limiter showing an end cap piece.

Referring now to FIGS. 1 and 2, interlocking bend limiter segment 10 comprises first semi-tubular section 20a and second semi-tubular section 20b. Second semi-tubular section 20b is substantially identical to first semi-tubular section 20a. First semi-tubular and second semi-tubular sections 20a,20b are dimensioned and configured to be joined cooperatively at their respective interlocks, the first semi-tubular section interlock tab receiver dimensioned and adapted to receive the corresponding interlock tab of the second semi-tubular section, the portions of the conduits of the cooperatively joined first semi-tubular and second semi-tubular sections providing an enclosed fluid pathway therethrough. One or both of first semi-tubular and second semi-tubular sections 20a,20b may comprise a plastic.

Each of first semi-tubular section 20a and second semi-tubular section 20b comprises substantially spherical first end 22, substantially semi-circular second end 26, and substantially semi-tubular middle section 28. First and second semi-tubular sections 20a,20b are dimensioned and configured to be joined without using additional fasteners.

Substantially spherical first end 22 further comprises engaging section 24 disposed about an outer surface of substantially spherical first end 22, its interior forming a portion of conduit 23 therethrough.

Substantially semi-circular second end 26 further comprises engaging section receiver 21 and interlock 30.

Engaging section receiver 21 is dimensioned and adapted to engage engaging section 24 of substantially spherical first end 22. The interior of engaging section receiver 21 defines a portion of a conduit therethrough. In embodiments, engaging section 24 is disposed about an outer surface of substantially spherical first end 24 and comprises ridge 27. In these embodiments, engaging section receiver 21 of first semi-tubular section 20a comprises channel 29 dimensioned and adapted to receive ridge 27 second semi-tubular section 20b, and vice-à-versa.

Interlock 30 comprises interlock tab 32 and corresponding interlock tab receiver 34.

Substantially semi-tubular middle section 28 is disposed intermediate substantially spherical first end 22 and substantially semi-circular second end 26. The interior of substantially semi-tubular middle section 28 defines a portion of conduit 23 therethrough.

In certain embodiments, each of first and second semi-tubular sections 20a,20b further comprises a plurality of alignment guides 50. These are typically disposed integral with a portion of substantially tubular middle section 28, where at least one of alignment guides 50 of first semi-tubular section 20a is dimensioned and configured to cooperatively receive another of alignment guides 50 of second semi-tubular section 20b. In typical configurations, alignment guides 50 comprise a post and a corresponding alignment guide receiver is dimensioned and configured to receive the post.

In certain embodiments, one or both of first semi-tubular and second semi-tubular sections 20a,20b further comprises an armored portion.

As can be seen in FIG. 1, when cooperative joined the interiors of first semi-tubular and second semi-tubular sections 20a,20b define conduit 23 therethrough.

Referring now to FIG. 2, using first semi-tubular and second semi-tubular sections 20a,20b, interlocking bend limiter 100 may be constructed and comprise one or more segments 110, where substantially spherical first ends 22 of interlocked first semi-tubular and second semi-tubular sections 20a,20b of a first segment 110 are cooperatively received into substantially semi-circular second ends 26 (FIG. 1) of a second segment 120, thereby locking the first and second semi-tubular sections 20a,20b of first segment 110 together. Interlocking bend limiter 100 is terminated using end piece 130 which is coupled to substantially spherical first ends 22 of second segment 120. End piece 130 is dimensioned and adapted to lock together first and second semi-tubular sections 20a,20b of second segment 120 together at an exposed end of the second segment. In some configurations, end piece 130 comprises a lock dimensioned and adapted to lock together second interlocking bend limiter section 120, e.g. one or more fasteners 132 such as bolts, clamps, bands, or the like, or a combination thereof.

When joined and terminated, the joined first and second segments 110, 120 are dimensioned and adapted to provide a predetermined amount of movement about at least two axes, e.g. an X and Y set of axes where one axis is positioned within the conduit defined by the interiors of first semi-tubular and second semi-tubular sections 20a,20b.

In most configurations, assembly of the first and second segments 110, 120 requires no bolts.

Figure 3:
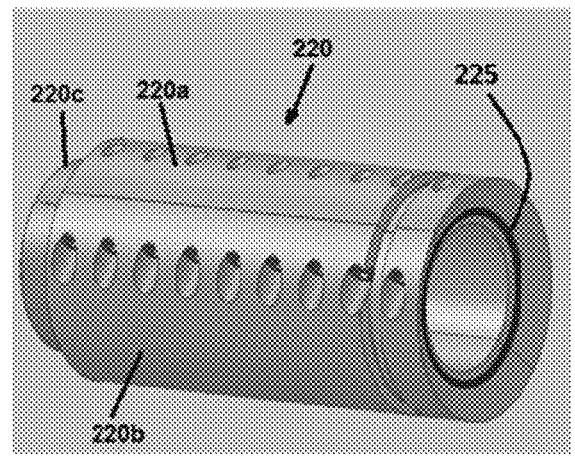
FIG. 3 is view in partial perspective of an exemplary subsea pipeline repair chain clamp comprising machinable length elements.
Figure 4:
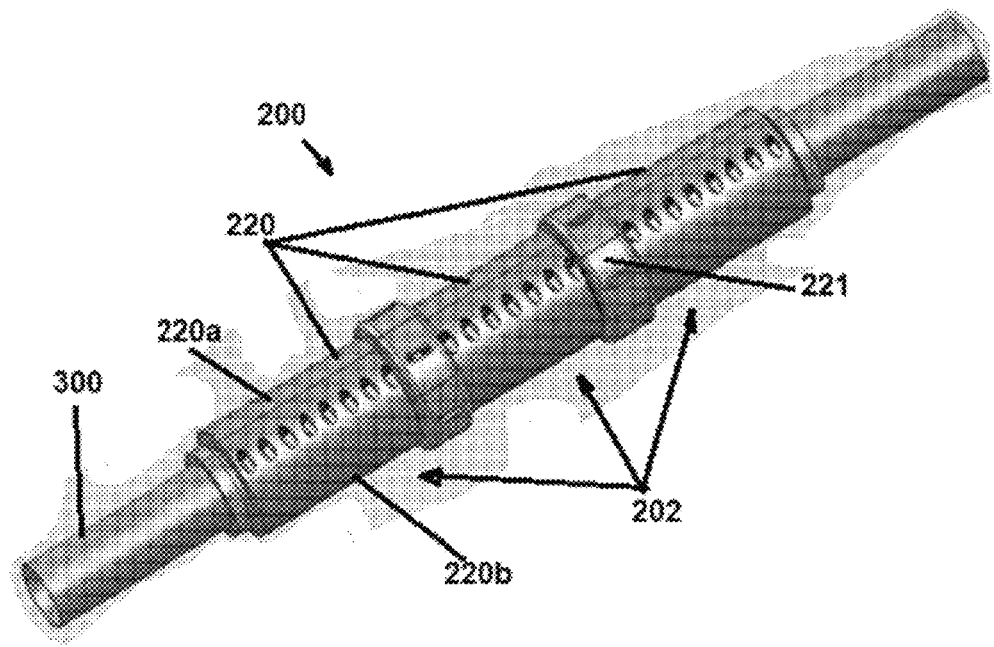
FIG. 4 is view in partial perspective of a set of exemplary subsea pipeline repair chain clamps comprising machinable length elements disposed about a section of subsea pipeline.

Referring now to FIGS. 3 and 4, in a different embodiment, as opposed to current subsea pipeline repair systems and methods, repair system 200 comprises one or more machinable length sections 220, e.g. interlocking sections 220a and 220b which are similar to bend limiter sections 20a and 20b, which function as chain clamps 202 to repair subsea pipeline 300 (FIG. 4) while subsea pipeline 300 is still in service. In other embodiments, machinable length sections 202 may comprise sections 220 that are locked in more traditional manners such as by using bolts or other fasteners, described below.

Chain clamp 220 comprises two or more clamp pieces 220a,220b, e.g. two halves which may comprise first semi-tubular section 20a and second semi-tubular section 20b as described above. Clamp pieces 220a,220b are typically assembled subsea in series on the subsea pipeline to whatever length is required to effect the repair. Typically, end 221 (FIG. 4) of each chain clamp 220a,220b, including those of end links 221 or close-out links 223, are spherical with respect to radius 224 and are struck from clamp hub to CL so chain clamps 220 can articulate without affecting the desired connection of chain clamps 220 and their sealing of the pipeline about which chain clamps 220 are assembled.

In certain embodiments, chain clamps 220 are as described above for first semi-tubular section 20a and second semi-tubular section 20b where first semi-tubular section 20a and second semi-tubular section 20b are further dimensioned to fit about the subsea pipeline. In alternative embodiments, chain clamps 220 are assembled with screws, bolts, or other fasteners, or the like, or a combination thereof.

Each chain clamp 220, including end 221 or close-out clamp 223, may be non-structural or structural and may further comprise with pipe-gripping slips 225.

Figure 5:
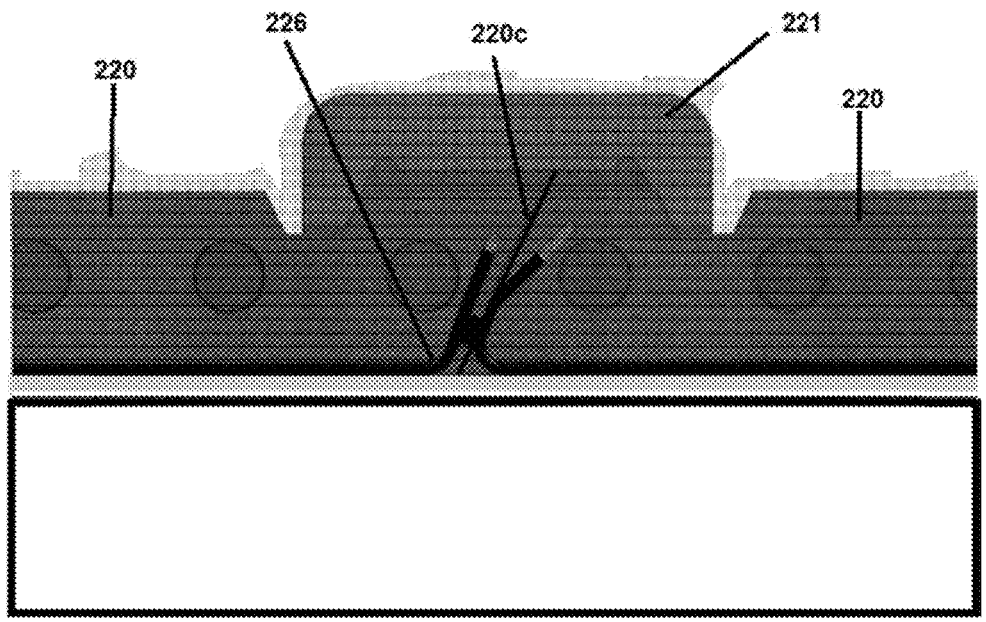
FIG. 5 is a cross section in partial perspective of an exemplary subsea pipeline repair chain clamp comprising machinable length elements and illustrating seal placement.
Figure 6:
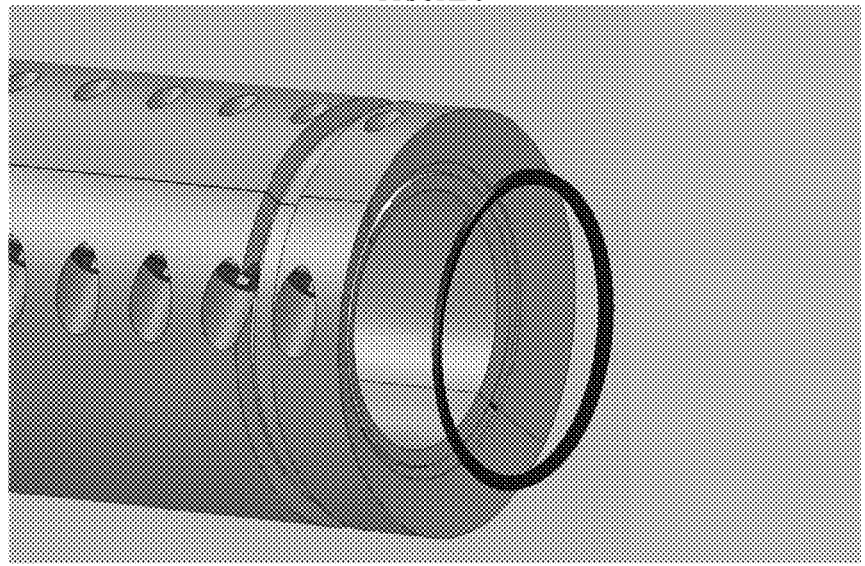
FIG. 6 is a view in partial perspective of an exemplary subsea pipeline repair chain clamp comprising machinable length elements and illustrating seal placement.

Referring addition to FIG. 5, each chain clamp 220, including end link 221 or close-out clamp 223, can further comprise one or more seals 226 disposed at a terminal portion of clamp 220 such as end 220c to effect sealing of the chain of chain clamps 220 about pipleline 300 (FIG. 4).

These seals 226 can comprise ring seals disposed intermediate chain claim seals 227 such as at mating ends 230.

In the operation of currently preferred embodiments, referring to FIGS. 1 and 2, interlocking bend limiter may be assembled by assembling first interlocking bend limiter segment 110, formed by joining first semi-tubular section 20a to substantially identical second semi-tubular section 20b. As described above, first semi-tubular and second semi-tubular sections 20a,20b each comprise substantially spherical first end 22, interlocking second end 26, and substantially semi-tubular section 28 disposed intermediate substantially spherical first end 22 and interlocking second end 26. When joined, interlocking second end 26 of first semi-tubular section 20a is cooperatively paired with interlocking second end 26 of second semi-tubular section 20b.

Second interlocking bend limiter section 120 is assembled similarly, but second interlocking bend limiter section 120 is assembled about substantially spherical first end 22 of first interlocking bend limiter section 110 by positioning engaging section receiver 21 of second interlocking bend limiter section 120 about engaging section 24 of substantially spherical first end 22 of first interlocking bend limiter section 110 and engaging interlocking second end 26 of first semi-tubular section 110 with interlocking second end 26 of second semi-tubular section 20b. As noted above, second interlocking bend limiter section 120 is substantially identical to first interlocking bend limiter section 110.

When two or more interlocking bend limiter sections, e.g. 110 and 120, have been assembled, end piece 130 is secured about substantially spherical first end 22 of the final interlocking bend limiter section in the chain, e.g. second interlocking bend limiter section 120, such as by use of one or more fasteners 132.

In a second embodiment, when a subsea pipeline is in need of repair but is not in such shape as to be totally abandoned, a series of chain clamp links 120 (FIG. 3) can be installed about that area of the subsea pipeline in need of repair, typically without taking the subsea pipeline out of service for any extended period of time. In certain embodiments, the repair may occur without taking the subsea pipeline out of service at all. In other embodiments, the repair may occur without taking the subsea pipeline out of service for any extended period of time.

Each of the required length (or set) of chain clamp links 120 is secured about the outer circumference of the pipeline and, where a plurality of such are required, each of the required length (or set) of chain clamp links 120 may be joined to the next chain clamp link 120 such that their respective seals xx form an occlusive seal about the pipeline outer surface. Accordingly, each chain clamp 120 can be joined to another chain clamp 120 until the desired length is obtained, and finished at the start, end, or both of the series of chain clamp links 120 by using end 121 or close-out links 123. If terminated with end 121 or close-out link 123, such end 121 or close-out link 123 is similarly occlusively sealed to the terminal chain clamp link 120 and pipeline.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A chain clamp link usable in a pipeline repair system, comprising:
   a. a first machinable length section comprising:
      i. a radius larger than a radius of a subsea pipeline;

ii. a first substantially spherical receiving end, the first substantially spherical receiving end comprising a first engaging section disposed about an outer surface of the first substantially spherical first end;
iii. a first substantially spherical mating end, the first substantially spherical mating end comprising an engaging section receiver dimensioned to engage the first engaging section of the first substantially spherical receiving end of the first machinable length section; and
iv. a first interlock, comprising:
1. a first interlock tab; and
2. a first corresponding interlock tab receiver;
b. a second machinable length section securably matable with the first machinable length section, the second machinable length section comprising:
i. a radius configured to be larger than the subsea pipeline radius;
ii. a second substantially spherical receiving end, the second substantially spherical receiving end comprising a second engaging section disposed about an outer surface of the second substantially spherical second end;
iii. a second substantially spherical mating end, the second substantially spherical mating end comprising an engaging section receiver dimensioned to engage the second engaging section of the second substantially spherical receiving end of the second machinable length section; and
iv. a second interlock, comprising:
1. a second interlock tab dimensioned and adapted to be received by a corresponding first interlock tab receiver;
2. and a second interlock tab receiver dimensioned and adapted to receive a corresponding first interlock tab; and
c. a seal disposed intermediate the first machinable length section and the second machinable length section, the seal configured to occlusively seal the mated first machinable length section and the second machinable length section against an outer surface of the pipeline.

2. The chain clamp link usable in a pipeline repair system of claim 1, wherein the chain clamp link further comprises a pipeline gripping slip.

3. The chain clamp link usable in a pipeline repair system of claim 1, wherein the chain clamp link is configured to be structural.

4. The chain clamp link usable in a pipeline repair system of claim 1, wherein:
a. the chain clamp comprises a plurality of chain clamps;
b. the first machinable length section and the second machinable length section of a predetermined number of the chain clamps further comprise a mating end; and
c. the first machinable length section and the second machinable length section of each of the plurality of chain clamps further comprise a receiving end configured to receive the mating end of a nearest chain clamp in the plurality of chain clamps.

5. The chain clamp link usable in a pipeline repair system of claim 4, wherein the receiving end and the mating end comprise a substantially spherical portion with respect to a radius struck from clamp hub to CL.

6. The chain clamp link usable in a pipeline repair system of claim 4, wherein at least one clamp link is configured to be an end clamp link defining a terminal clamp link in the plurality of clamp links.

7. The chain clamp link usable in a pipeline repair system of claim 6, wherein the chain clamp links further comprise an end seal disposed at least at one of their receiving end or their mating end, the end seal configured to effect sealing of the plurality of chain clamp links about the pipeline.

8. The chain clamp link usable in a pipeline repair system of claim 4, further comprising a ring seal disposed intermediate at least one of the chain clamps.

9. The chain clamp link usable in a pipeline repair system of claim 8, wherein the ring seal is disposed proximate the mating end of the chain clamp.

10. The chain clamp link usable in a pipeline repair system of claim 1, wherein:
a. the engaging section disposed about the outer surface of the substantially spherical first end of the first machinable length section comprises a ridge; and
b. the engaging section receiver of the second machinable length section comprises a channel dimensioned and adapted to receive the ridge.

11. The chain clamp link usable in a pipeline repair system of claim 1, wherein the first and second machinable length sections are dimensioned and configured to securably mate by being joined by their engaging sections without using additional fasteners.

12. The chain clamp link usable in a pipeline repair system of claim 1, further comprising an end piece coupled to the substantially spherical first ends of a terminating first and second machinable length sections at an interlocked exposed end of the terminating first and second machinable length sections, the end piece dimensioned and adapted to lock terminating first and second machinable length sections together.

13. The chain clamp link usable in a pipeline repair system of claim 1, wherein the first and second machinable length sections securably mate by using a fastener.

14. A method of pipeline repair, comprising:
a. locating a portion of a pipeline needing repair subsea;
b. positioning a first machinable length section of a chain clamp at an outer surface of the portion of the pipeline needing repair, the first machinable length section comprising a first seal and a first joining end;
c. positioning a second machinable length section of the chain clamp at the outer surface of the portion of the pipeline needing repair opposed to where the first machinable length section is positioned, the second machinable length section comprising a second joining end;
d. securably mating the first machinable length section to the second machinable length section about the outer surface of the portion of the pipeline needing repair such that the joined chain clamps are allowed to articulate with respect to the first joined end and the second joined end without affecting the connection; and continuing to securably mate the first machinable length section to the second machinable length section about the outer surface of the portion of the pipeline needing repair until the first seal occlusively seals the chain clamp about the portion of the pipeline needing repair.

15. The method of pipeline repair of claim 14, wherein:
a. the second machinable length section comprises a second seal; and
b. securing the first machinable length section to the second machinable length section about the outer surface of the portion of the pipeline needing repair further comprises having the first seal and the second seal occlusively seal the chain clamp about the portion of the pipeline needing repair.

16. The method of pipeline repair of claim 14, further comprising:
   a. assembling a series of chain clamps subsea until the series of chain clamps extends about a desired length of the portion of the pipeline needing repair;
   b. joining each of the series of chain clamps to its proximate neighboring chain clamp;
   c. terminating an end of the series of chain clamps with an end chain clamp section, the end chain clamp section comprising a third seal; and
   d. securing each chain clamp and end chain clamp section about the outer circumference of the pipeline such that the chain clamp seals form an occlusive seal about the outer circumference of the pipeline.

17. The method of pipeline repair of claim 16, further comprising terminating both the starting chain clamp and the terminal chain clamp with at an end chain clamp section.

* * * * *